(12) United States Patent
De Beer

(10) Patent No.: US 7,359,501 B2
(45) Date of Patent: Apr. 15, 2008

(54) TELEPHONE CALL DIALLING

(75) Inventor: Leon De Beer, Newbury (GB)

(73) Assignee: Interoute Communications Limited, London (GB)

( * ) Notice: Subject to any disclaimer, the term of this patent is extended or adjusted under 35 U.S.C. 154(b) by 996 days.

(21) Appl. No.: 10/221,485

(22) PCT Filed: Mar. 14, 2001

(86) PCT No.: PCT/GB01/01111

§ 371 (c)(1),
(2), (4) Date: Mar. 20, 2003

(87) PCT Pub. No.: WO01/69896

PCT Pub. Date: Sep. 20, 2001

(65) Prior Publication Data
US 2003/0165227 A1 Sep. 4, 2003

(30) Foreign Application Priority Data
Mar. 15, 2000 (GB) .................................. 0006292.7

(51) Int. Cl.
H04M 7/00 (2006.01)
H04Q 3/00 (2006.01)
(52) U.S. Cl. ..................... 379/221.01; 379/221.02; 379/221.06; 379/221.14
(58) Field of Classification Search ........... 379/201.05, 379/219, 220.01, 221.01, 221.02, 221.05, 379/221.06, 221.14; 455/414.1
See application file for complete search history.

(56) References Cited
U.S. PATENT DOCUMENTS 5,515,427 A * 5/1996 Carlsen et al. ......... 379/201.05

5,953,657 A 9/1999 Ghisler

FOREIGN PATENT DOCUMENTS

| EP | 0 693 859 | 1/1996 |
|----|-----------|--------|
| GB | 2 298 335 | 8/1996 |
| WO | 99 04578  | 1/1999 |
| WO | 99 11050  | 3/1999 |

* cited by examiner

Primary Examiner—Harry S. Hong
(74) Attorney, Agent, or Firm—Oblon, Spivak, McClelland, Maier & Neustadt, P.C.

(57) ABSTRACT

A device for making telephone calls receives input data defining a call destination. The device generates a request message which is output to a control center, a response message then being received from the control center identifying a preferred route for routing the call to the call destination. The routing information is utilized by the device in initiating communication with the call destination. Typically the input data is a telephone number and the dialing means initiates communication using a modified telephone number which may include a prefix obtained from routing data contained in the response message. Response messages may be stored in a cache memory to reduce the need for request messages. The device may be a mobile telephone operating in a cellular telecommunications network or may be a landline device such as telephone or facsimile machine. Where the device is a mobile telephone, the response message may include additional information such as updating information for stored preferred network and barred network tables.

53 Claims, 18 Drawing Sheets

ROUTING A TELEPHONE CALL

ROUTING A TELEPHONE CALL

DIALLING FROM A MOBILE TELEPHONE

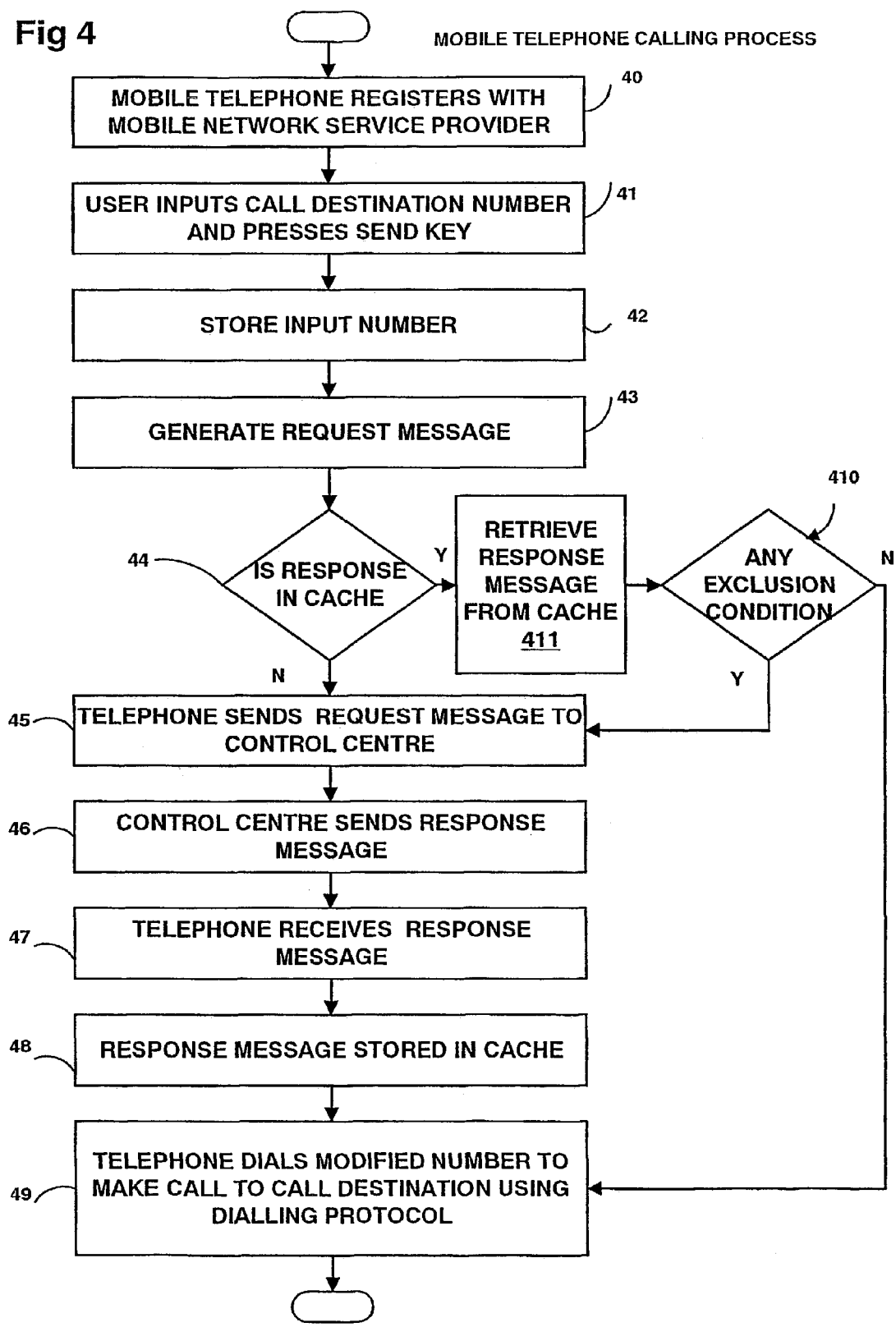

Fig 5 REQUEST MESSAGE
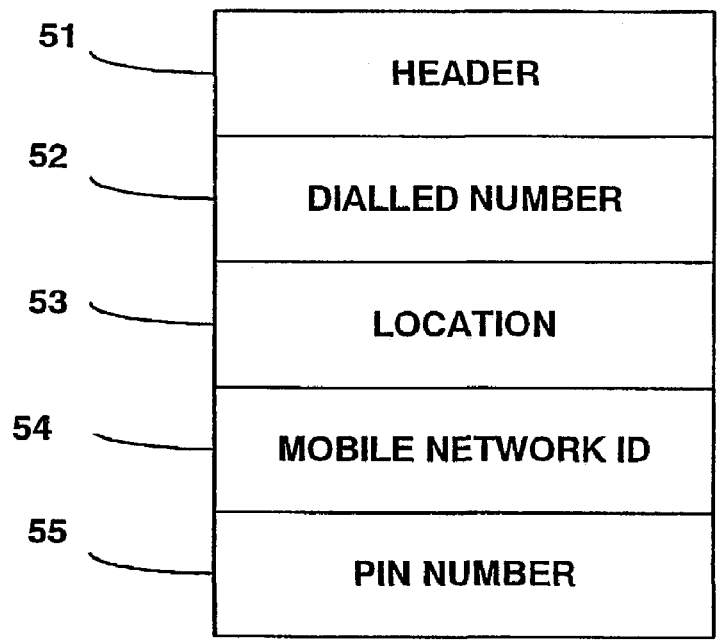
Fig 6 RESPONSE MESSAGE
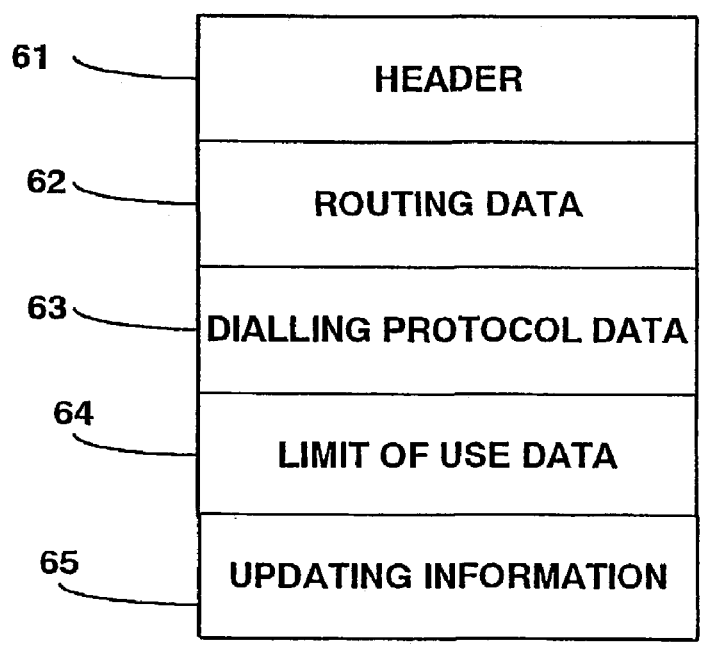

DIALLING A TELEPHONE CALL VIA A PBX

Fig 9    PBX

DIALLING A TELEPHONE CALL
FROM A FIXED LINE TELEPHONE

Fig 12 REQUEST MESSAGE
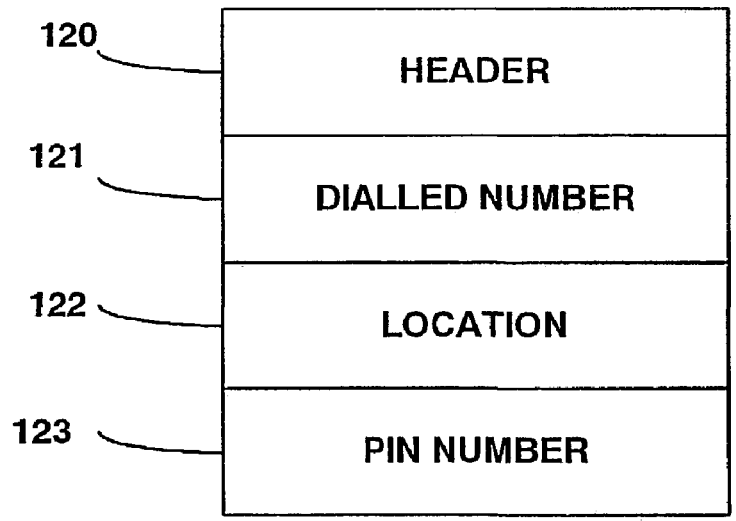
Fig 13 RESPONSE MESSAGE
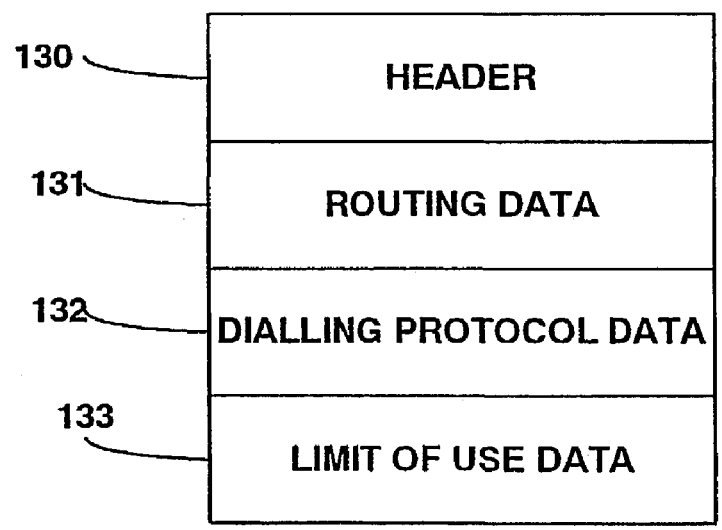

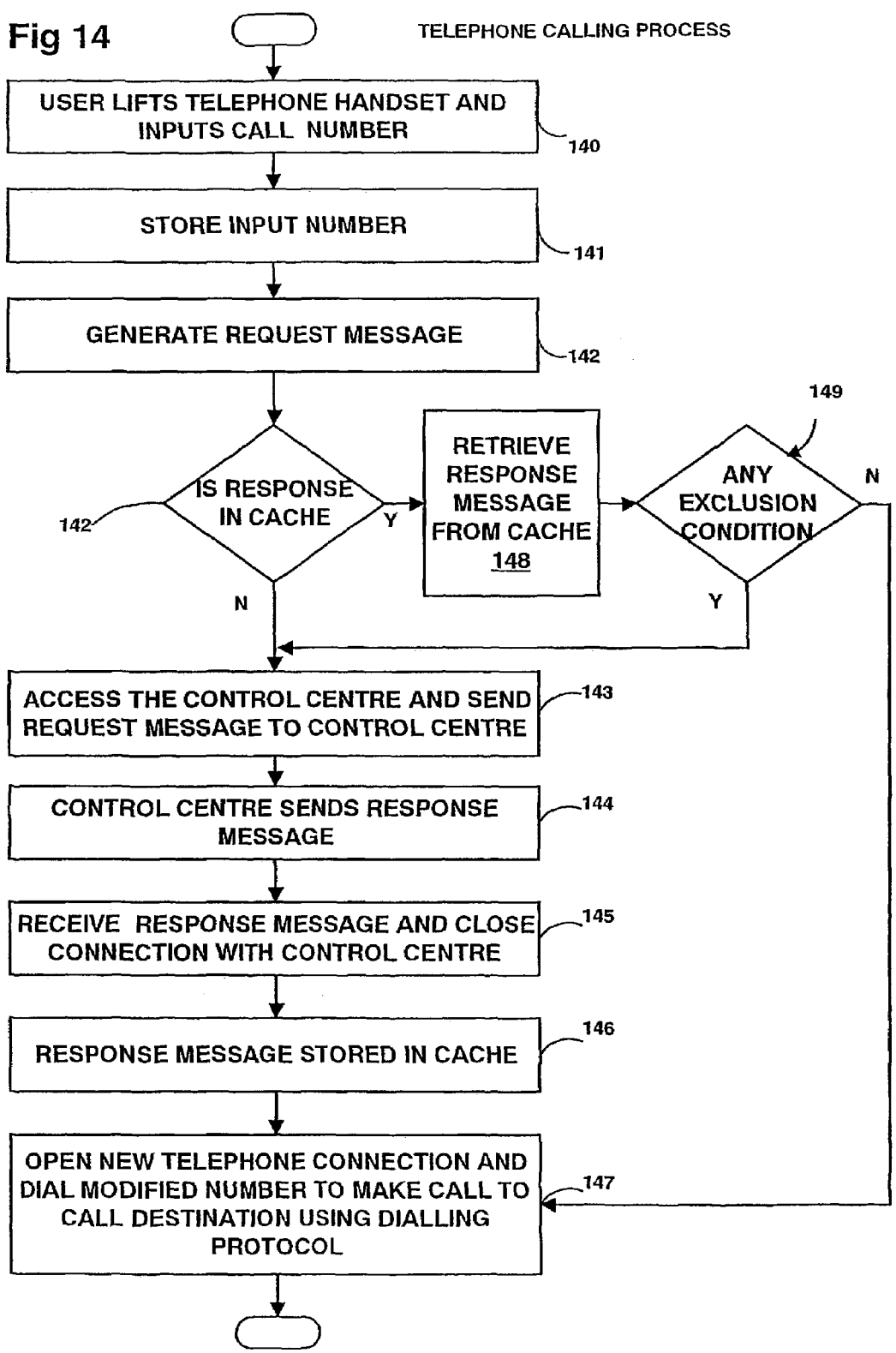

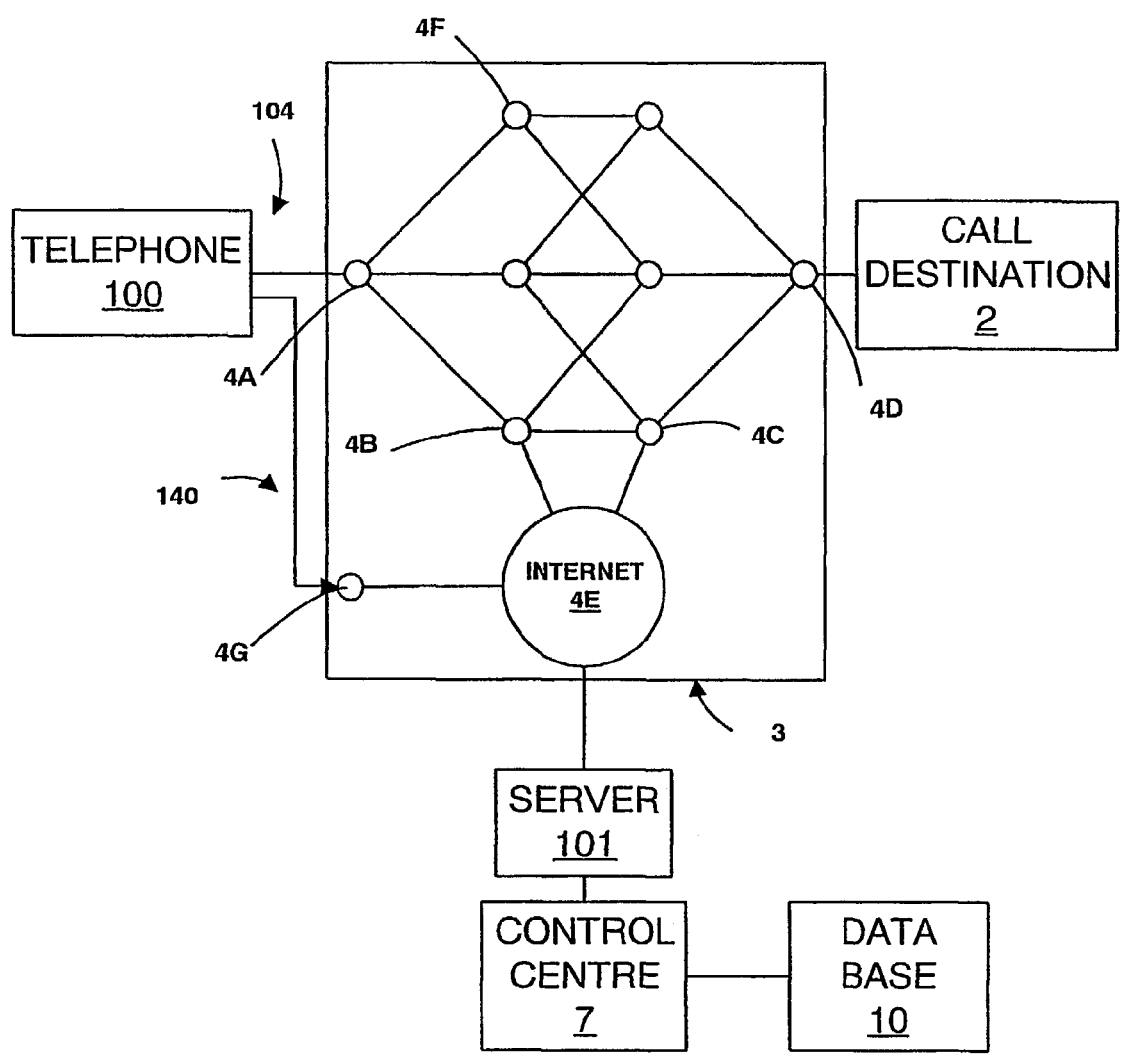
Fig 15    DIALLING A TELEPHONE CALL FROM A FIXED LINE TELEPHONE HAVING SEPAREATE INTERNET CONNECTION

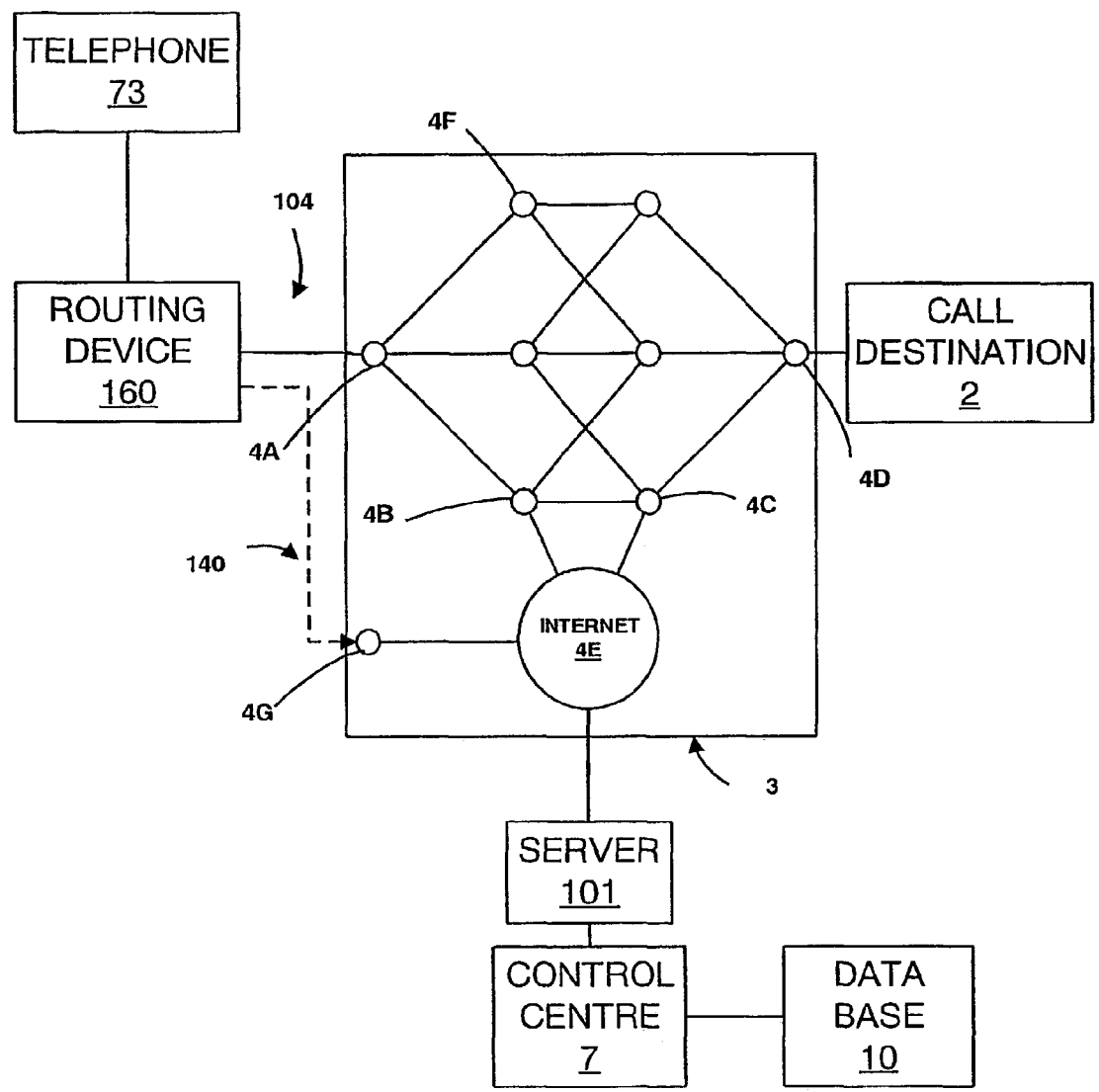
Fig 16 — DIALLING A TELEPHONE CALL FROM A FIXED LINE TELEPHONE CONNECTED TO A ROUTING DEVICE

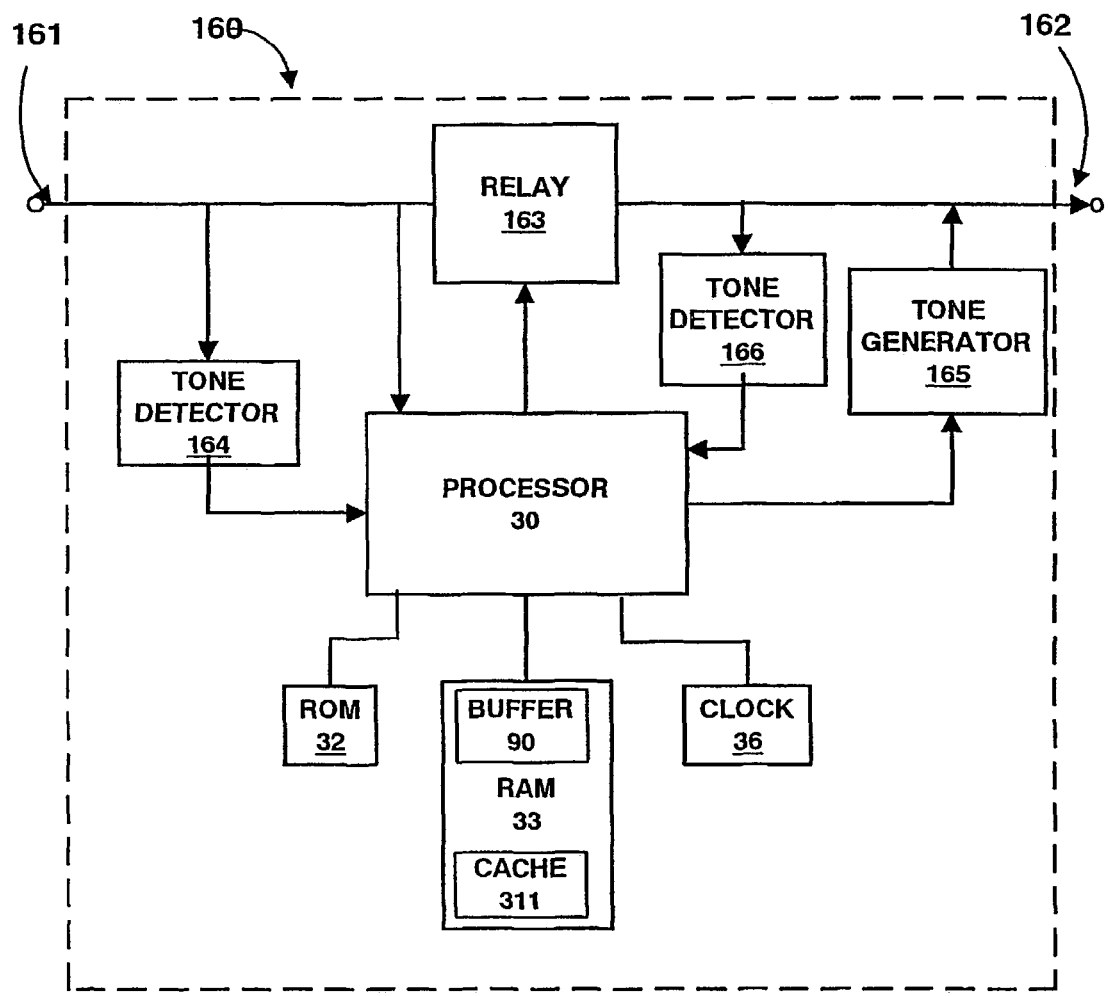
Fig 17   ROUTING DEVICE

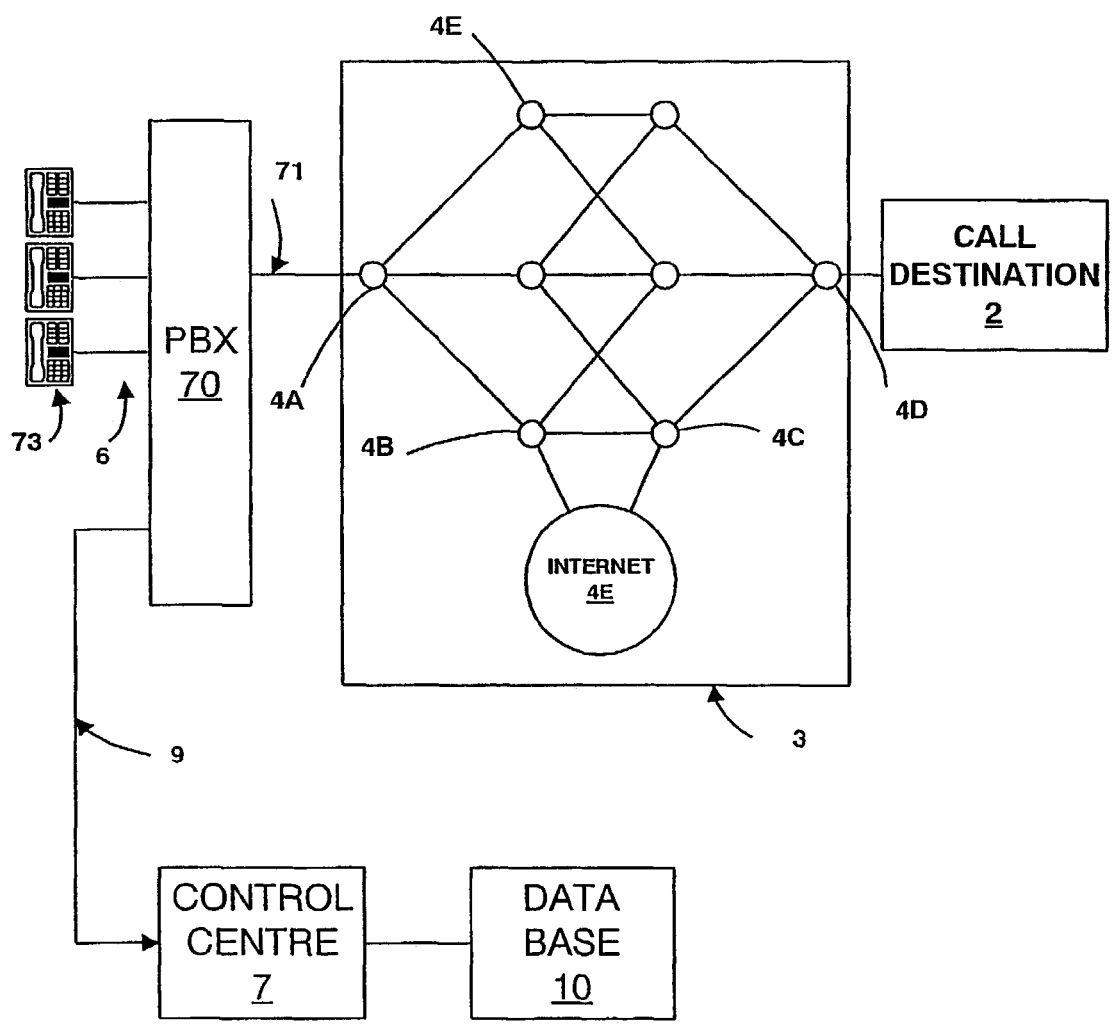
Fig 18 — DIALLING A TELEPHONE CALL VIA A PBX WITH ON - SITE CONTROL CENTRE

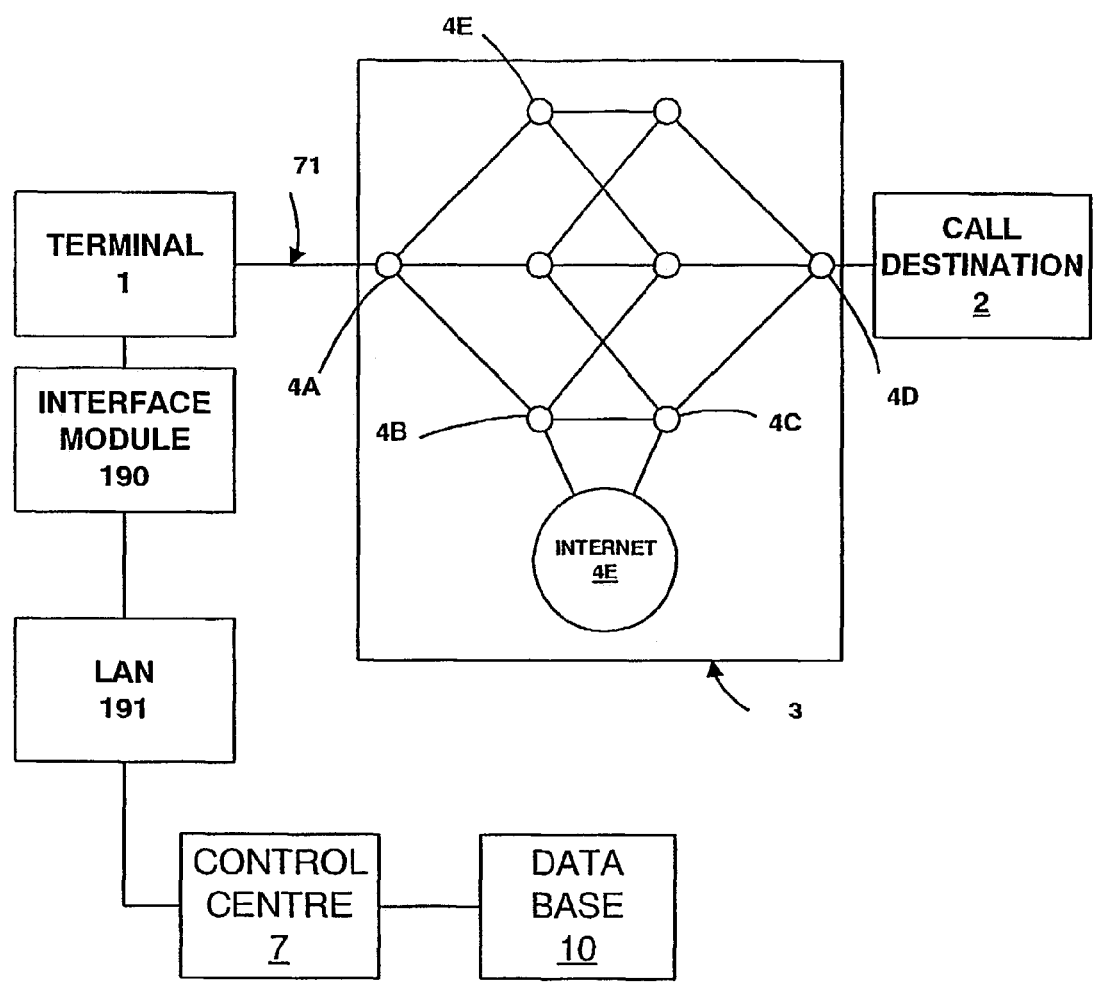
Fig 19 — DIALLING A TELEPHONE CALL VIA A TERMINAL WITH LOCAL AREA NETWORK CONNECTION TO THE CONTROL CENTRE

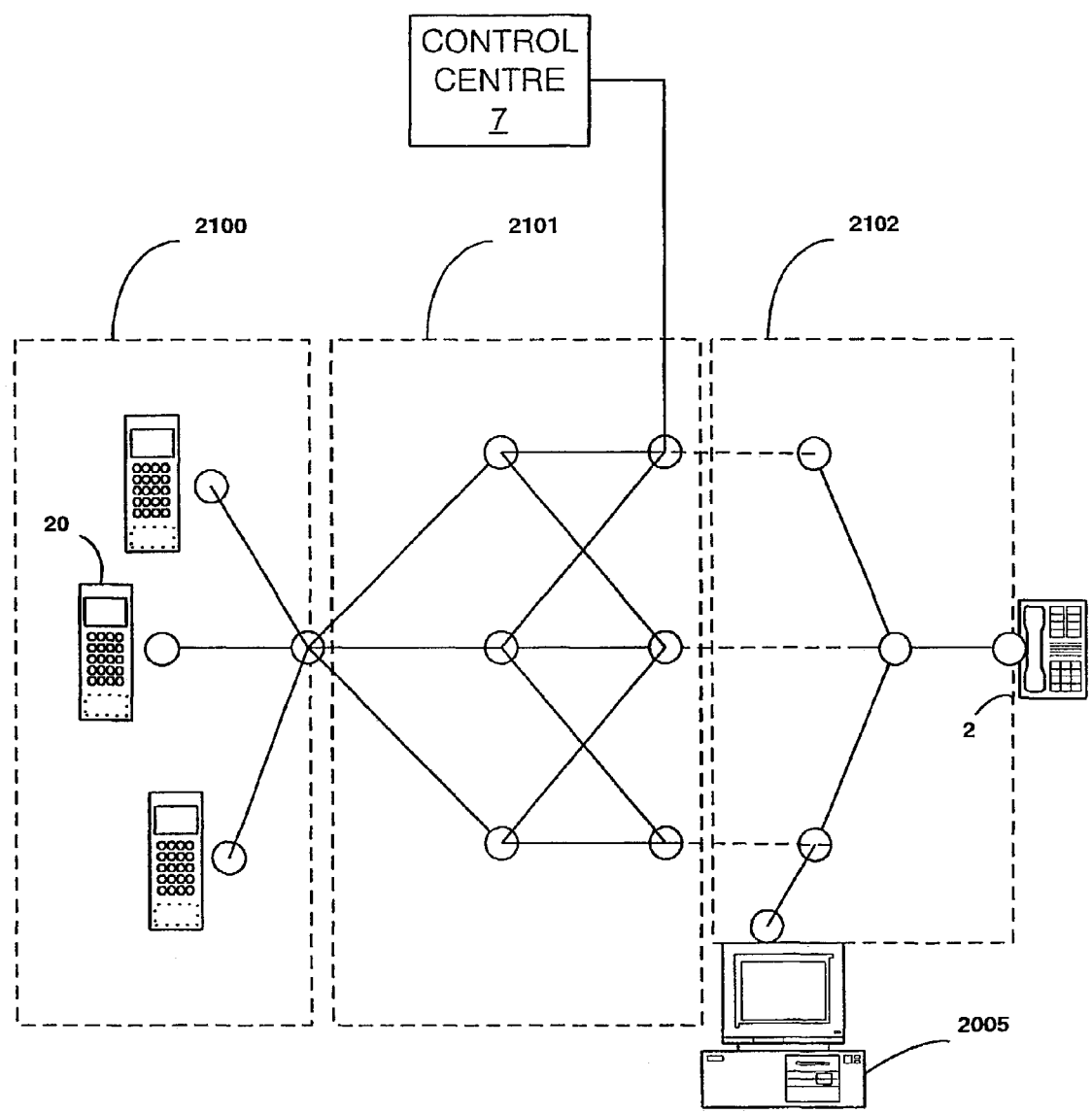
Fig 20  ROUTING VIA INTEGRATED PACKET SWITCHED NETWORK

TELEPHONE CALL DIALLING

This invention relates to telephone call dialing and in particular to the use of telecommunications terminals capable of dialing telephone numbers and modifying the telephone number input by a user in order to obtain preferred call routing.

Recent trends in telecommunications have resulted in a proliferation in the number of telephone networks and service providers available to a user of telecommunication devices such as telephones, facsimile machines and various types of computer based apparatus equipped with modems. A user wishing to initiate a telephone call for a communications session for audio, audio visual, facsimile, or digital data transmission with a call destination will generally input the telephone number of the call destination to the telecommunications device and will rely upon the network to which the device is locally connected to decide upon the route taken by the call between the local network and the call destination. Alternatively, the user may choose to access facilities of a service provider by adding a prefix to the call destination telephone number. The service provider may then provide services at reduced costs and may include routing the call in a manner determined by the service provider.

It is known from WO 00/07347 to provide a telephone which includes a route determining means which automatically modifies the number input by the user when dialing an outgoing call, the telephone having means for referring to an internally stored look-up table covering all possible call destinations to obtain routing information for determining the optimum route, thereby allowing an appropriate prefix code to be automatically selected and added.

Such arrangements however require the look-up table to be refreshed with updating information in order to take account of changes in charging rates applied by service providers for given routes and to take account of variations in performance characteristics of various networks from which a selected route is to be chosen.

The present invention seeks to provide an improved method of routing telephone calls and a telecommunications device for use in such a method.

One aspect of the present invention provides a communications device which responds to the input of a telephone number by sending a request message to a control centre in order to obtain a response message which includes routing data. A modified telephone number which includes the routing data is then dialed to access the call destination via a preferred route. The message may contain the modified number in its entirety. Alternatively, the routing data may be a prefix to be added to the input telephone number or instructions for otherwise modifying the input telephone number.

Another aspect of the invention relates to the use of a cache memory for storing response messages received from the control centre.

Embodiments are described in which a device in accordance with the present invention may be constituted by a telephone, facsimile machine, computer apparatus, private branch exchange or routing device.

A further aspect of the invention relates to a control centre for receiving request messages and generating response messages.

Preferred embodiments of the present invention will now be described by way of example only and with reference to the accompany drawings of which;

FIG. 4 is a schematic flowchart illustrating the process of making a mobile telephone call using the mobile telephone of FIGS. 2 and 3;

FIG. 5 is a schematic diagram showing the structure of a request message generated by the mobile telephone of FIG. 2;

FIG. 6 is a schematic diagram showing the structure of a response message received by the mobile telephone of FIG. 2;

FIG. 12 is a diagram illustrating a request message generated by the telephone of FIG. 10;

FIG. 13 is a diagram of a response message received by the telephone of FIG. 11;

FIG. 14 is a flowchart illustrating the process of making a telephone call using the telephone of FIG. 10;

FIG. 15 is a schematic diagram of a telephone having a separate Internet connection;

FIG. 16 is a schematic diagram of a routing device used for routing calls between a telephone and a call destination;

FIG. 17 is a schematic diagram of the structure of the routing device of FIG. 16;

FIG. 18 is an illustration of an alternative PBX having an on-site control centre;

FIG. 19 is an illustration of an alternative embodiment in which a terminal is provided with an interface module for local area network connection to the control centre; and FIG. 20 is an illustration of routing via an integrated packet switched network.

Figure 1:
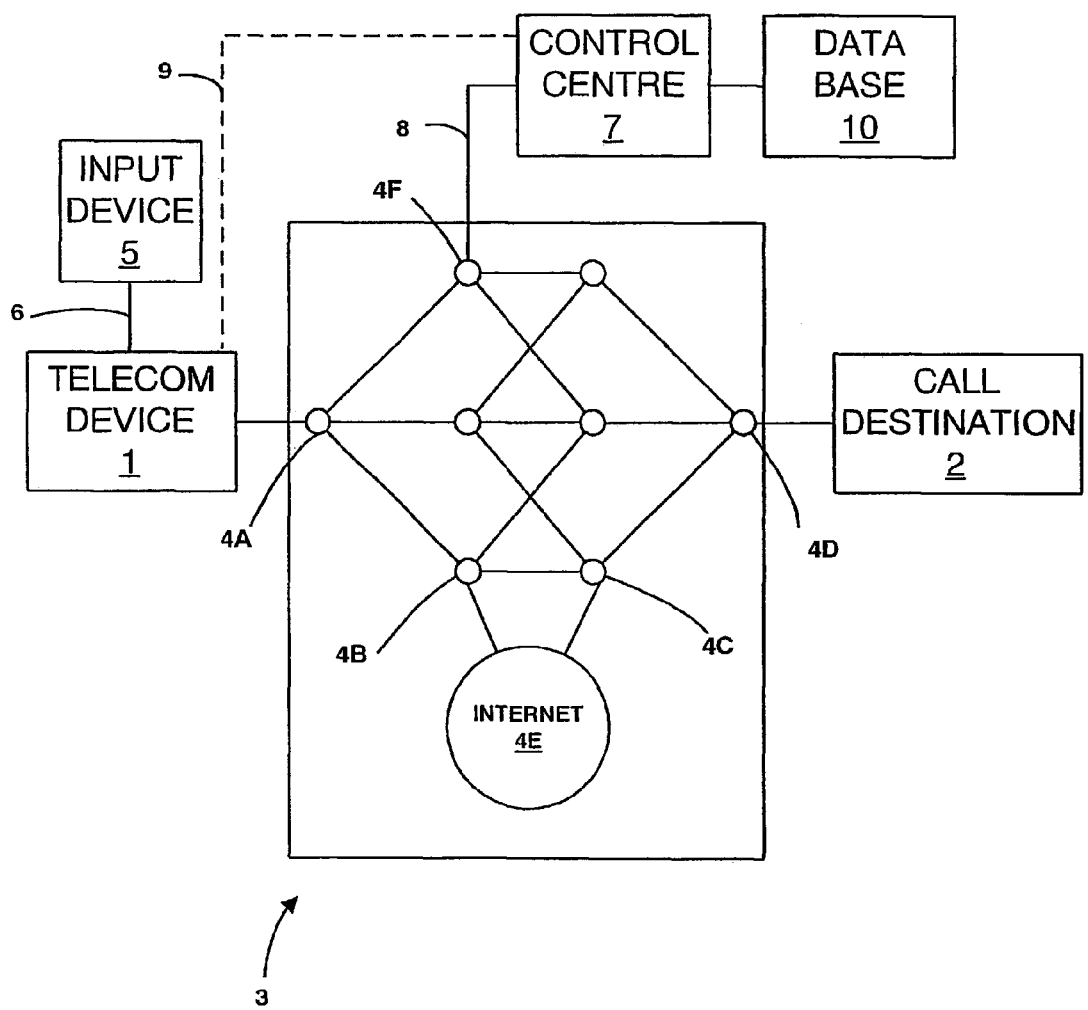
FIG. 1 is a schematic diagram of a generalised telecommunications device connected to a call destination via a telecommunications system.

FIG. 1 represents schematically the manner in which a telephone call is made from a generalised telecommunications device 1 to a call destination 2 via a telecommunications system 3. The telecommunications system 3 is schematically represented as a mesh network in which each of the nodes 4 is a constituent network. For example, a call may be initially routed via a cable network 4A which is the local network for the user's telecommunications device 1, the call then being routed via network 4B which is a landline network administered by a first carrier, and a third network 4C providing international connection to a further land line network 4D which is local to the call destination 2.

As represented schematically in FIG. 1, a number of alternative possibilities exist for interconnection between the networks 4 available within the telecommunications system 3, such networks also including packet switching networks such as the Internet 4E.

An input device 5 associated with the telecommunications device 1 is used by the user to input the call number defining the call destination 2. The input device 5 may be integral with the telecommunications device 1 or may be separate from and connected for communication with the telecommunications device 1 via a connection 6 which, in the case of separate location of the input device 5, could be a transmission line.

A control centre 7 is accessible for communication with the telecommunications device 1 for the exchange of information. In FIG. 1, communication path 8 illustrates the control centre 7 being connected to a node 4F of the telecommunications system 3 so that an exchange of information with the telecommunications device 1 requires a communications session via the cable network 4A and the network of the node 4F.

Also shown in FIG. 1 is an alternative communication path 9 which, in accordance with a further embodiment described in greater detail below with reference to FIG. 18, replaces the communication path 8 by providing a direct link between the control centre 7 and the telecommunications device 1, as for example in the case of the control centre 7 being located in sufficient proximity with the telecommunications device 1 to make such direct communication advantageous.

In use, a user inputs the telephone number of the call destination 2 using the input device 5 and this is received by the telecommunications device 1. The telecommunications device 1 generates a request message which is transmitted to the control centre 7 and contains data representative of the input call number. The request message also identifies the location of the telecommunications device 1 and identifies the user by means of an identification code. The control centre 7 evaluates the received information characterising the required connection to the call destination 2 and determines a preferred route. A response message is communicated from the control centre 7 to the telecommunications device 1 and includes routing data which allows the device to use a modified telephone call number which, when dialed by the telecommunications device 1, will establish the preferred route via the telecommunications systems 3 to the call destination 2 via a preferred sequence of networks represented in FIG. 1 by nodes 4.

The response message also includes any dialing protocol data which may be required, for example when it is necessary to allow a predetermined wait-period to elapse between dialing an initial sequence of digits such as a prefix code and dialing the remaining sequence of digits of the modified telephone number. The dialing protocol data may additionally, if necessary, contain information concerning any handshake procedure to be followed in acquiring access to networks 4 in the preferred route.

The control centre 7 communicates with the networks of the preferred route to generate billing information to the user. The control centre 7 also monitors the performance characteristics and charging rates required by the nodes 4 of the telecommunications system 3 in order to maintain an up-to-date database 10 to which reference can be made by the control centre for determining the preferred route in response to each request message.

Figure 2:
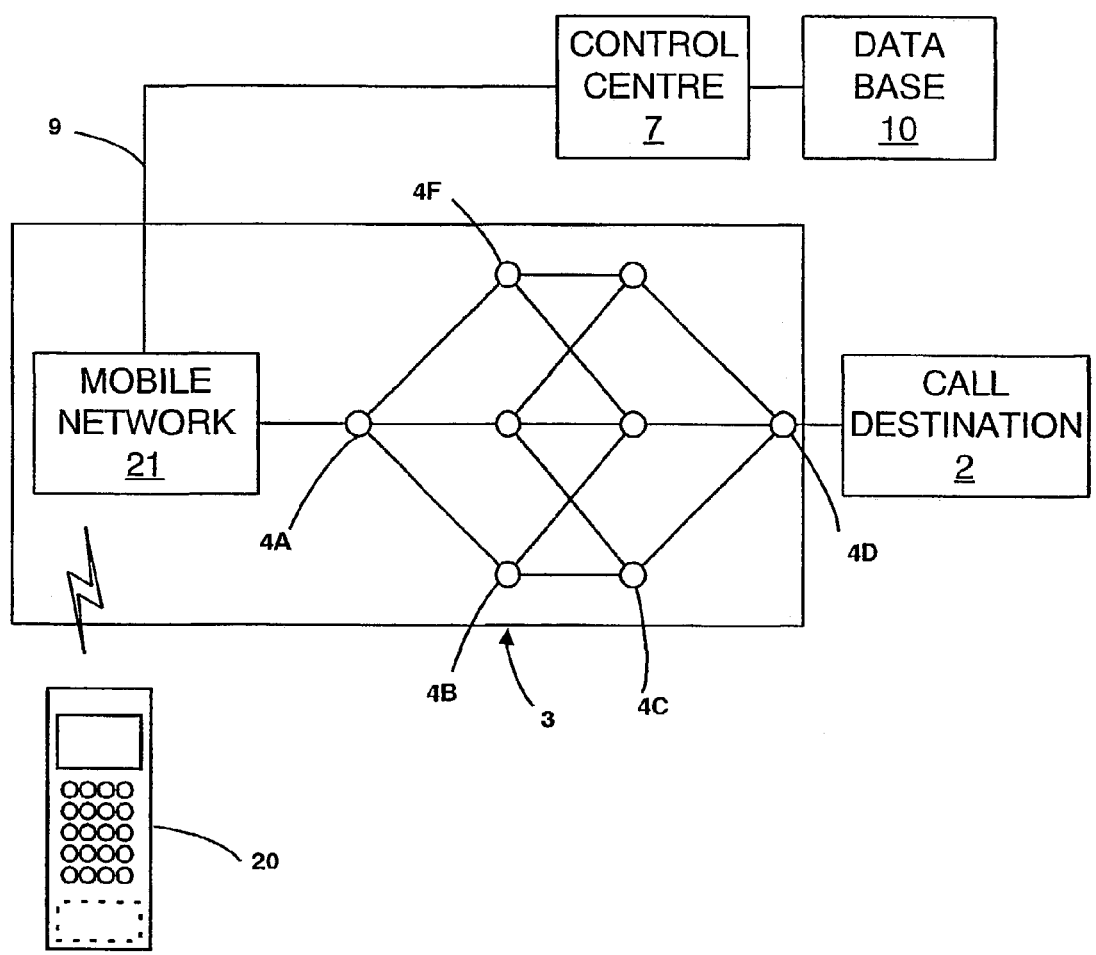
FIG. 2 is schematic diagram of a mobile telephone connected to a call destination via a telecommunications system.

FIG. 2 illustrates an embodiment in which the telecommunications device 1 of FIG. 1 is a mobile telephone 20 and will be described using corresponding references to those of FIG. 1 where appropriate for corresponding elements.

Figure 3:
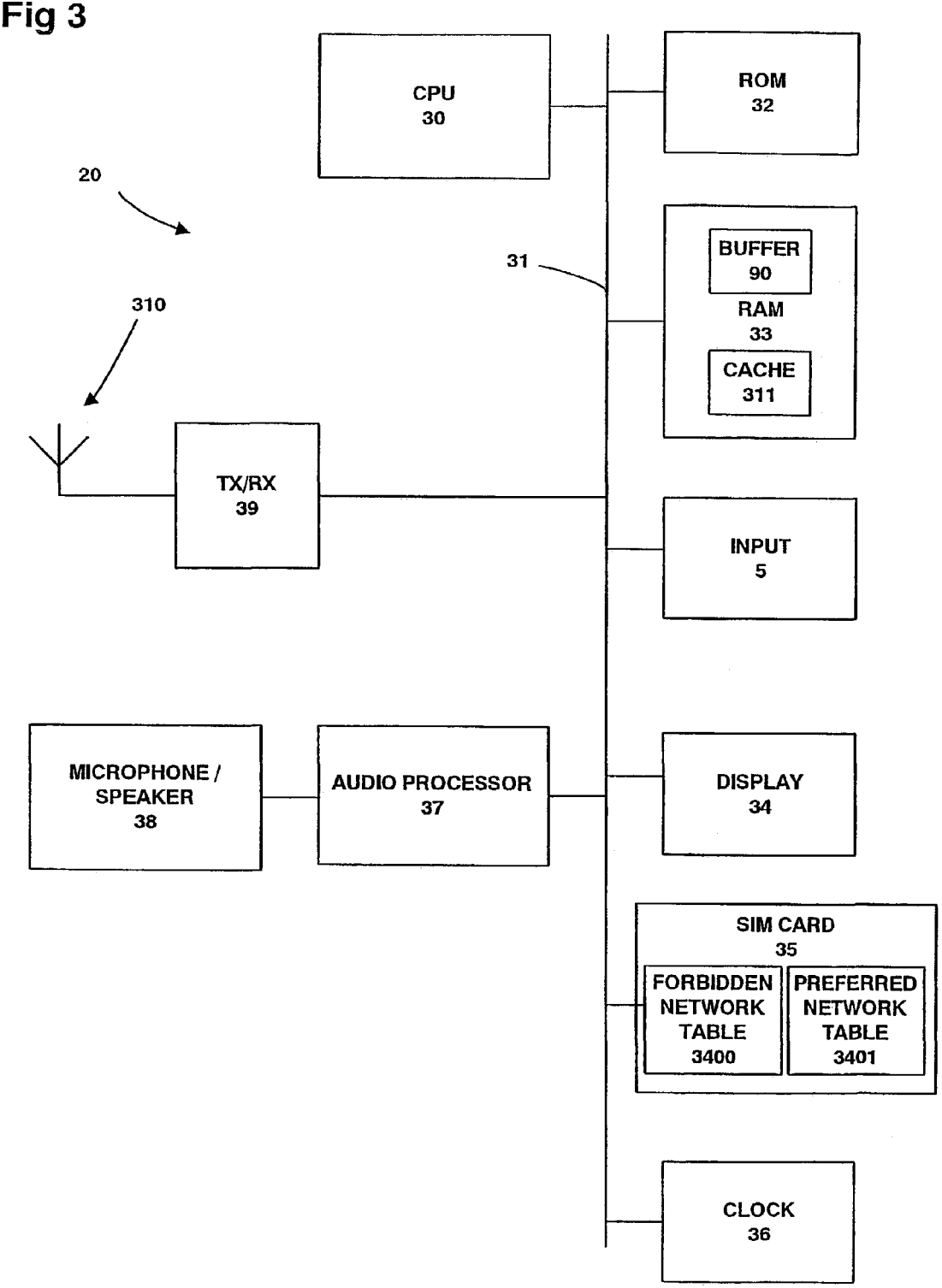
FIG. 3 is a schematic diagram showing the structure of the mobile telephone of FIG. 2.

The mobile telephone 20 has a conventional circuit configuration as illustrated schematically in FIG. 3 and is shown to be in wireless communication with a mobile telephone network 21 which is illustrated as constituting a node of the telecommunications system 3. Calls from the mobile telephone 20 may therefore be routed from the mobile telephone network 21 through the telecommunications system 3 to the call destination 2 via a number of routes determined by the selection of nodes 4.

The control centre 7 is also served by the mobile telephone network 21 for receiving and sending data messages using whatever data message protocol is available to the particular mobile telephone network being utilised.

In the present example, the SMS (Short Message Service) protocol is utilised in a GSM (Global System for Mobile communications) cellular network, enabling the request and response messages to be represented in a text format.

As shown in FIG. 3, the mobile telephone 20 includes a processor 30 connected via a bus 31 to a ROM (read only memory) 32 and a RAM (random access memory) 33. An input device 5 is provided in the form of a keypad integrally formed with the casing of the mobile telephone 20, a display 34 also being provided for the display of dialed numbers and other information.

The mobile telephone 20 also includes a SIM (Subscriber Identification Module) card 35 storing data specific to the individual mobile telephone and user. The SIM card 35 also stored programs for data management, data retrieval and message generation, as described in detail below. The SIM Toolkit Application Interface is implemented in the SIM card, the SIM Toolkit being an emerging standard in SIM development. SIM Toolkit compliant applications may be stored in the SIM card 35 in either flash memory, ROM or masked ROM.

An internal clock 36 is also provided together with an audio processor circuit 37 and microphone and speaker circuit 38.

A transmit and receive circuit 39 controlled by the processor 3 is connected to an antenna 310.

The RAM 33 includes a cache memory 311 and buffer memory 90, the use of which will be described below.

In FIG. 2, the mobile telephone 20 is shown connected to a single mobile network 21. It is to be understood however that the mobile network 21 may comprise any number of distinct service providers having shared or separate base stations and hardware and that the control centre 7 is able to send and receive messages via any of such service providers. The user of a given mobile telephone 20 may in practice only have access only to a single service provider of the mobile network 21 or alternatively the user may have access to a plurality of such service providers under a roaming agreement which allows the user to make use of whichever service provider is available in the geographical location of the mobile telephone, or to allow the user to be selective where more than one service provider is able to provide at a given location.

Typically therefore, the mobile telephone 20 stores in the SIM card 35 a forbidden network table 3400 and a preferred network table 3401. The mobile telephone 20 needs to register with a service provider before any communication is possible and the tables 3400 and 3401 are referred to before completing the registration process, firstly to prevent registration with any network with which the subscriber is barred from registration, and secondly to select the preferred network in a case where more than one service provider is available at a given location.

The manner in which the mobile telephone 21 is utilised is illustrated schematically in the flowchart of FIG. 4.

At step 40, the mobile telephone 20 is turned on and registers with a service provider of the mobile network 21. If necessary, the user may assist in the selection of the service provider to be used for the making of a telephone call by operating a selection function of the mobile telephone 20.

When the user requires to make a telephone call, the user inputs at step 41 the call destination number using the input device 5 and presses the send key of the mobile telephone 20 to initiate the call dialing process. The mobile telephone 20 stores the input number in the buffer memory 90 in RAM 33 at step 42 and at step 43 generates a request message as illustrated schematically in FIG. 5. In the present example, the request message is in the SMS format and comprises a header 51, the input number 52 corresponding to the telephone number of the call destination, location information 53, identification data 54 which identifies the service provider with which the mobile telephone is registered and via which the call is to be made, and a PIN (Personal Identification Number) number 55 which identifies the user. The process of generating the request message is implemented using an application stored in the SIM card 35.

At step 44, the processor 30 checks the cache memory 311 to determine whether a response message corresponding to the generated request message already exists in the cache memory. If no such response message exists, the processor 30 controls the operation of the mobile telephone 20 to send at step 45 the request message in SMS format to the control centre 7 via the mobile telephone network 21.

At step 46, the control centre 7 responds by sending a response message to the mobile telephone 20, the response message having the structure illustrated schematically in FIG. 6. The response message in SMS format consists of a header 61, routing data 62 defining a modified telephone call number for directing a call to the call destination 2 via a preferred route determined by the control centre 7, dialing protocol data 63 containing information required to correctly implement the modified telephone number, and "limit of use data" 64 which is conditional information including for example a time-out period determining the useful life of the response message in the cache memory 311. The response message also includes updating information 65 for updating data stored in the SIM card 35. This information includes the forbidden network table 3400 and the preferred network table 3401. Receiving this updating information 65 thereby enables the control centre to reconfigure the operating parameters of the mobile telephone 20 including the manner in which the service provider is selected at the time of registration in accordance with the tables 3400 and 3401.

At step 47 in FIG. 4, the mobile telephone 20 receives an SMS message which it determines to be a response message from the control centre 7 by decoding the header 61 and processes the response message in a manner which inhibits display of the SMS message on the display 34. The processor 30 at step 48 stores the response message in the cache memory 311 in association with a copy of the request message in respect of which the response message was received so that any subsequently generated request message can be compared with the contents of the cache memory to determine whether a response to that particular request has already been received and stored.

At step 49, the mobile telephone 20 initiates the telephone call by making an outgoing call via the service provider of the mobile telephone network 21 using the routing data 62 contained in the response message corresponding to the input number 52. The routing data 62 may simply comprise the full digits of the modified number. Alternatively, the routing data may comprise a prefix code to be added to the input telephone number stored in the buffer memory 90 by the processor 30. Similarly, the routing data may comprise instructions for changing digits of the input telephone number If at step 44 it is determined that the cache memory 311 already contains an entry corresponding to the request message and including an associated response message, the response message is read at step 411 from the cache memory and processed in the processor 30. At step 410 the processor determines from the limit-on-use data 64 contained in the response message stored in the cache memory whether any condition exists which would exclude use of the routing data 62. For example, an exclusion condition would exist if the clock 36 indicated that a time-out period included in the limit-of-use data had expired. The response message may for example be stored in the cache memory 311 with a time-out period setting a limit of 24 hours of re-use.

If such an exclusion condition exists, control passes to steps 45 to 49 as indicated above. If no exclusion conditions exists, control passes to step 49, the mobile telephone 20 dialing the outgoing modified number contained in the response message obtained from the cache memory 311.

The steps indicated in FIG. 4 are controlled by a computer program operated by the processor 30. The program may be stored in the SIM card 35 or in the ROM 32. Alternatively, the computer program may be downloaded into the ROM 32 or RAM 33 via a suitable data input from an external device which receives the program in the form of a computer readable medium such as a compact disc, DVD, or floppy disc, or which alternatively receives the program as a signal transmitted via a network such as the Internet. Alternatively, the mobile telephone 20 may have a reader for receiving the input of a program, for example in the form of a smart card reader for extracting the program code from a smart card.

In the above example, the following numerical data further illustrates the specific detail of calling the call destination 2.

In this example, the user is a customer of Cellnet (Trademark), a service provider of mobile telephone networks, but is utilising a roaming agreement to make use of the network service provider France Telecom (Trademark) while located in France. The user wishes to make a telephone call to a destination defined by call destination number 001907123456 and enters this number using the keypad 5 of the mobile telephone 20.

The user then presses the send button of the mobile telephone 20. The mobile telephone processor 30 determines that the cache memory 311 does not hold a response message corresponding to a request message generated on the basis of the above numerical details. The mobile telephone 20 therefore transmits a message using the SMS format to the control centre 7 which responds by transmitting a response message in which the routing data 62 defines the modified telephone number to be 08008887770001907123456.

The mobile telephone 20 receives this SMS message and determines that the SMS message is from the control centre 7 and is therefore not to be displayed on the display 34. The processor 30 stores the request and response messages in the cache memory 311.

The mobile telephone 20 then reads the routing data from the cache memory 31 and generates an outgoing call in which the modified number is dialed using the protocol information 63, if any.

A further embodiment will now be described with reference to FIG. 7 using corresponding reference numerals to those of preceding figures where appropriate for corresponding elements.

Figure 7:
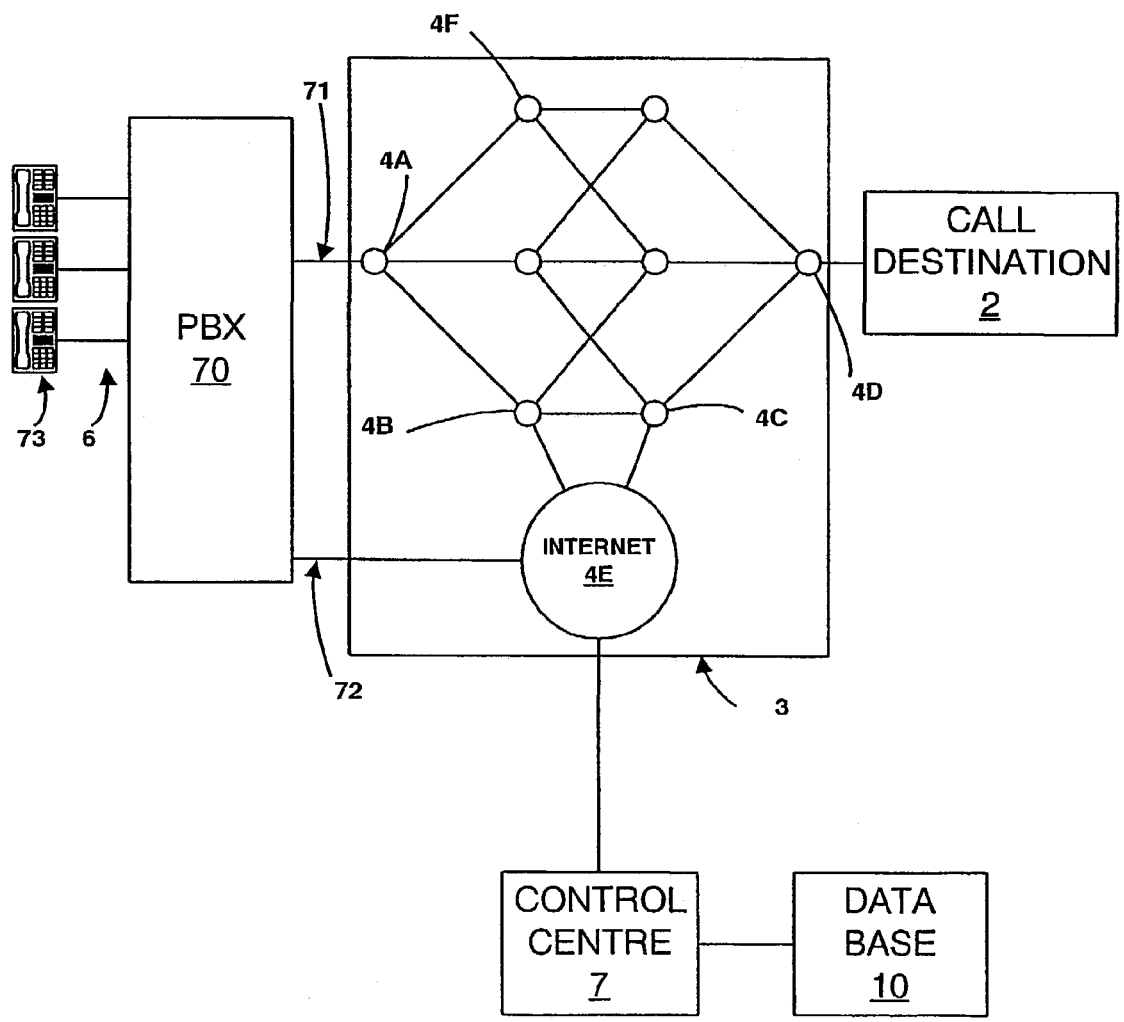
FIG. 7 is a schematic diagram of a PBX connected to a call destination via a telecommunications system.

In FIG. 7, a PBX 70 (private branch exchange) is installed to handle the communications traffic of a company or office building in which a plurality of telecommunications devices 1 are connected to the PBX for both internal and external connection. The telecommunications devices 1 typically include telephone sets 73, facsimile machines and personal computers equipped with modems.

For purposes of illustration a call destination 2 is shown connected to the PBX 70 via the telecommunications system 3.

The PBX 70 communicates with a local exchange 4A via land lines 71 and a number of different alternative network connection routes exist within the telecommunications system 3 between the local network 4A and the local network 4D of the call destination 2. The Internet 4E is represented as a node of the telecommunications system 3 and is also accessed directly by the PBX via a dedicated leased line 72 for this purpose, the leased line 72 providing connection to an Internet service provider for this purpose.

Figure 9:
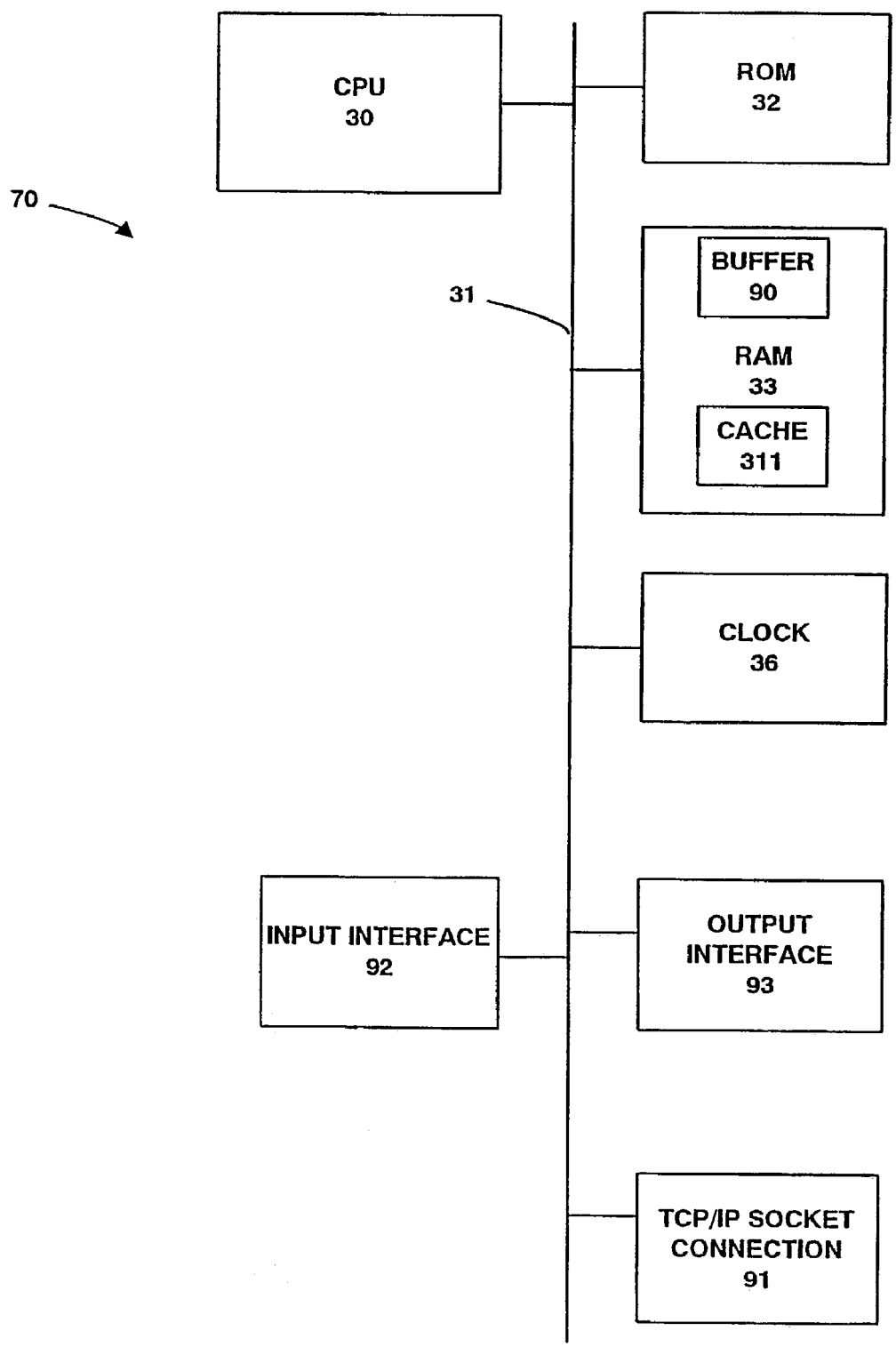
FIG. 9 is a schematic diagram illustrating the components of the PBX of FIG. 7.

The leased line 72 is connected to a TCP/IP socket connection 91 of the PBX 70 as illustrated in FIG. 9.

The PBX 70 of FIG. 7 functions in a manner corresponding to the generalised telecommunications device 1 of FIG. 1 in the case where the input device 5 is constituted by one of the telephone sets 73 which are connected to the PBX by connections 6 in the form of transmission lines comprising simple conductor pairs.

FIG. 9 illustrates schematically the structure of the PBX using corresponding reference numerals to preceding figures where appropriate for corresponding elements.

The PBX 70 includes a processor 30, ROM 32, and a RAM 33 which includes a buffer memory 90 and cache memory 311.

An internal clock 36 is also provided. A TCP/IP socket connection 91 is provided for direct Internet access. An input interface 92 handling calls received from the telephones of the PBX system is also controlled by the processor and also an output interface handling calls between the PBX and telecommunications system 3.

Figure 8:
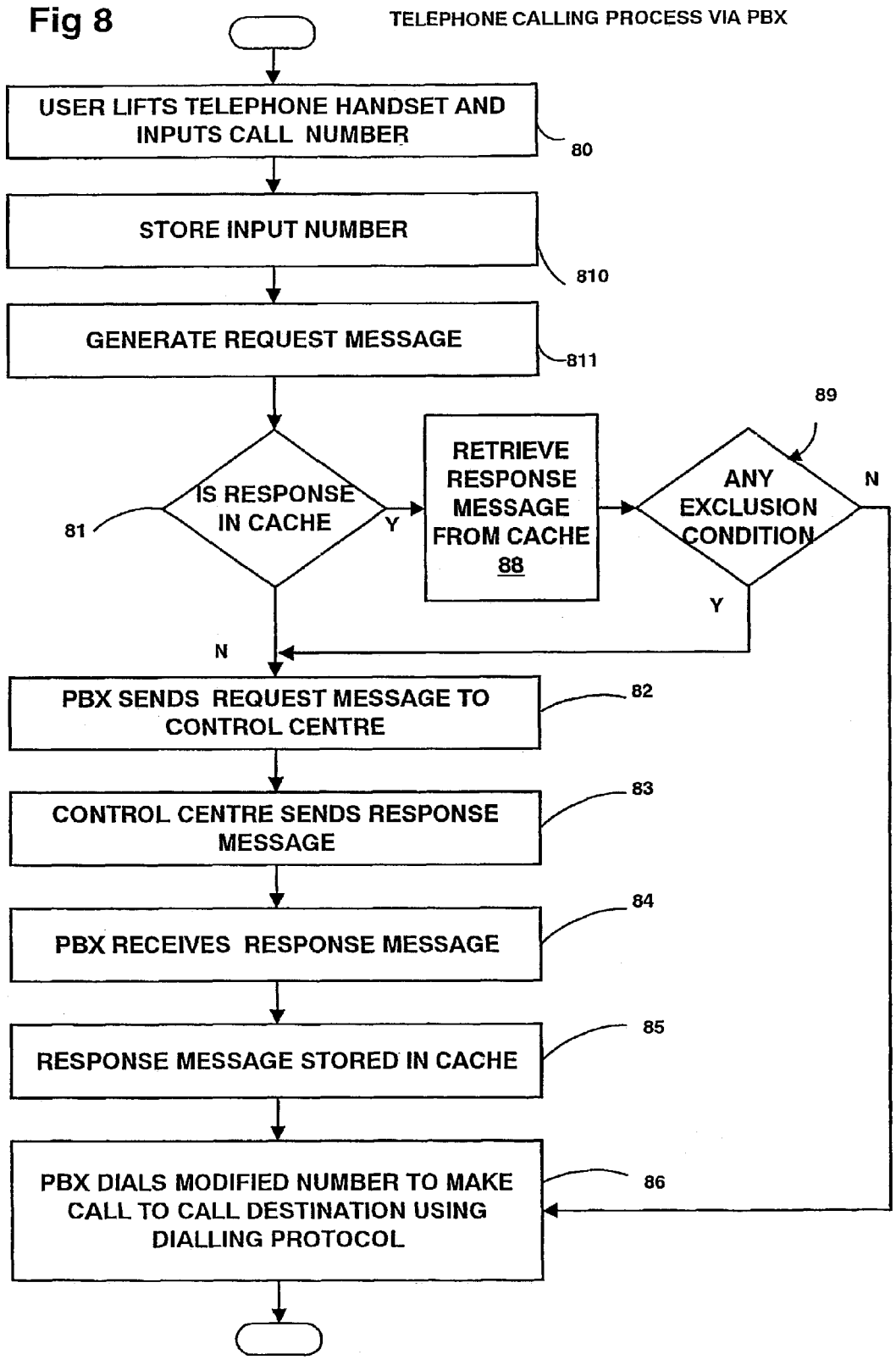
FIG. 8 is a flowchart illustrating the process of making a telephone call via the PBX of FIG. 7.

The PBX 70 functions in response to the input of a user dialed telephone number in the manner described in the schematic flowchart of FIG. 8.

At step 80 the user initiates a telephone call by lifting the receiver and establishing connection with the PBX 70 and inputs the input call destination number required to access the call destination 2. The PBX 70 stores at step 810 the user dialed input number in the buffer memory 90 in RAM 33 and generates at step 811 a request message corresponding in content to the request message described above with reference to FIG. 5. The processor 30 of the PBX 70 interrogates at step 81 the cache memory 311 in RAM 33 to determine whether the cache memory currently holds a response message corresponding to the request message and, if no such response message is available in cache memory, the PBX opens at step 82 the TCP/IP socket connection 91 to the Internet 4E and transmits at step 83 the request message to the control centre 7.

The control centre 7 responds at step 83 to the request message by the return transmission of a response message including routing data defining a modified telephone number, the response message having a content corresponding to the response message of FIG. 6 described above.

The PBX 70 receives at step 84 the response message via the TCP/IP socket connection 91 and stores at step 85 the response message in cache memory 311. At step 86 the Internet connection is closed and the PBX 70 then proceeds to generate at step 87 the outgoing call using the modified call number and protocol information, if any, contained in the response message.

If at step 81, it is determined that a response message corresponding to the request message is contained in the cache memory 311, the processor 30 retrieves at step 88 the response message from the cache memory and determines at step 89 whether any exclusion condition precludes use of the routing data as a result of the limit-on-use data 69 contained in the response message, referring to the internal clock 32 of the PBX to determine whether any time-out period has expired.

If use of the routing data is precluded by the limit-on-use data 69, control reverts to step 82 and the procedure of step 82 to 87 above is followed. If however no exclusion exists, then the control passes to step 87, the PBX 70 generating the outgoing call using the modified call number and call protocol information, if any, contained in the response message retrieved from the cache memory 311.

In the present example, the user dials 001907123456 and the PBX 70 receives a response message resulting in the PBX actually dialing the modified number 08008887770001907123456, thereby routing the call via a preferred route to the call destination 2. The control centre 7 generates billing information for the operator of the PBX 70 accordingly.

A further embodiment will now be described with reference to FIG. 10 using corresponding reference numerals to those of preceding figures where appropriate for corresponding elements.

Figure 10:
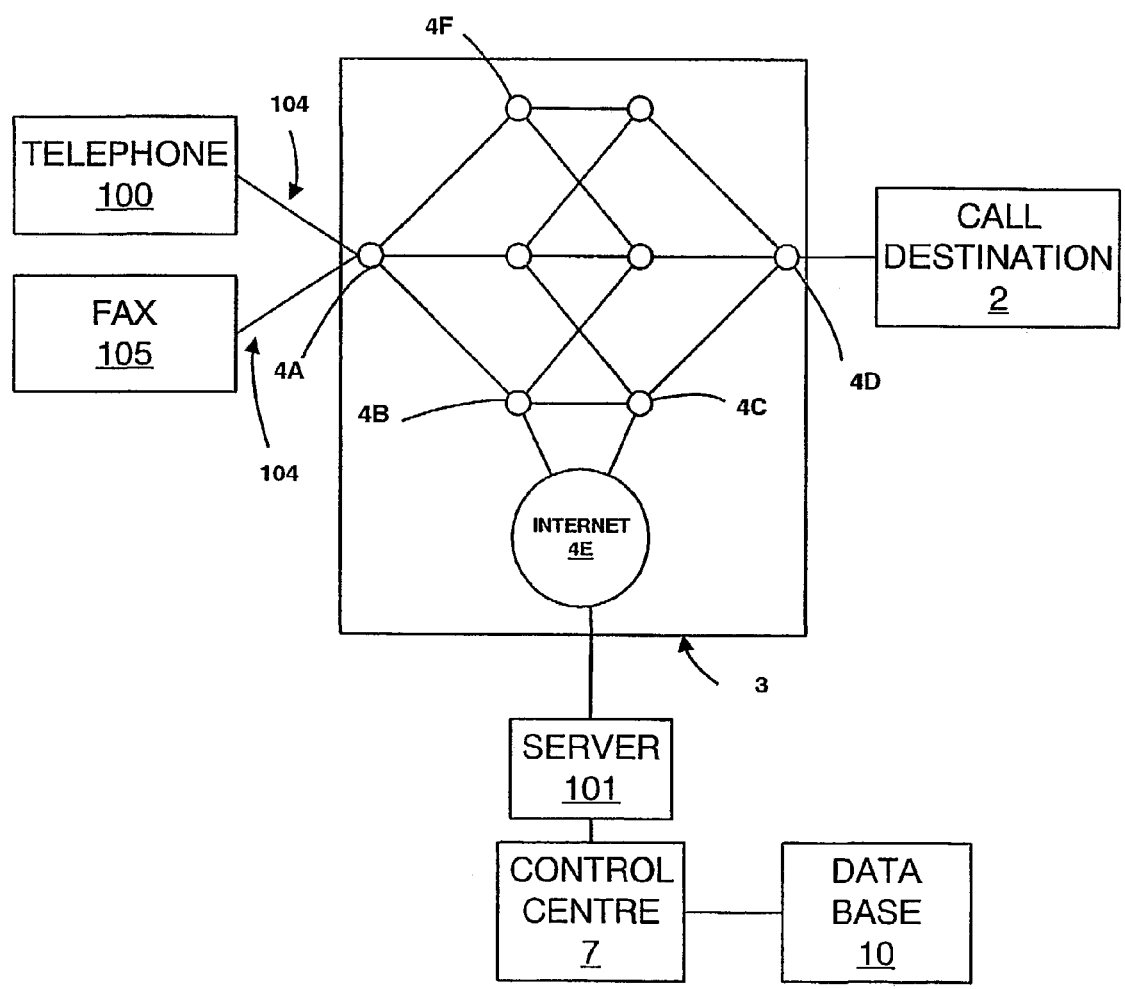
FIG. 10 is a schematic diagram illustrating a telephone connected to a call destination via a telecommunications system.

In FIG. 10, a telecommunications device is constituted by a telephone 100 which is connected to a local exchange 4A of a telecommunications system 3 and is used by a user to make a telephone call to a call destination 2. A control centre 7 has a server 101 accessible via the Internet 4E which is in the present example regarded as a constituent network of the telecommunications system 3.

Figure 11:
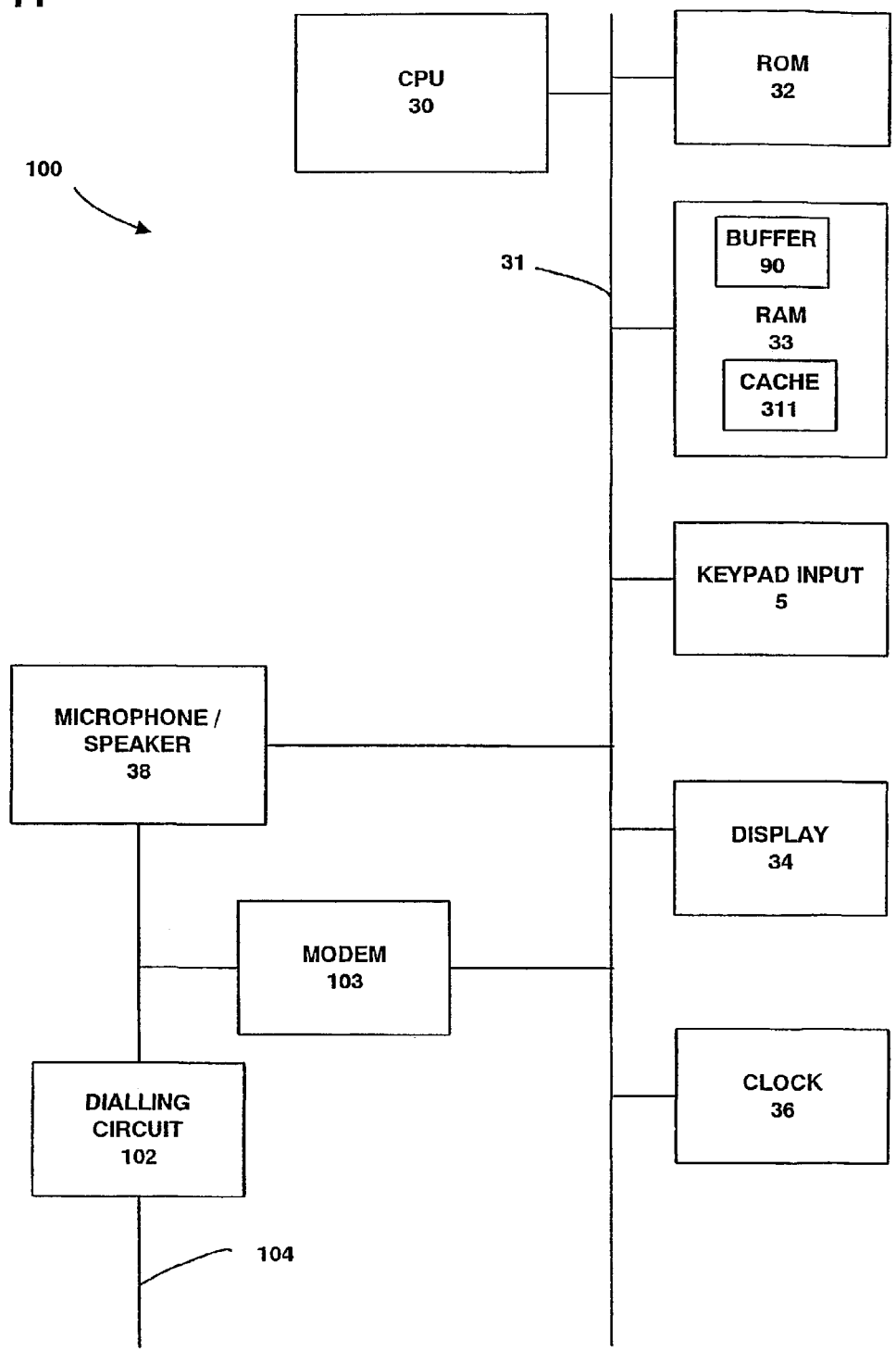
FIG. 11 is a schematic diagram of the components of the telephone of FIG. 10.

The structure of the telephone 100 is illustrated schematically in FIG. 11 which shows a processor 30 connected via a databus 31 to a ROM 32, a RAM 33 including cache memory 311 and buffer memory 90, a keypad input device 5, a display 34 and an internal clock 36. The telephone 100 also includes a microphone and speaker circuit 38, a dialing circuit 102 and a modem 103, each of which is connected to a telephone line 104.

The process of making a telephone call from the telephone 100 is illustrated in the flowchart of FIG. 14.

When a user inputs at step 140 the telephone number of a call destination 2 using the keypad input 5, the processor 30 stores at step 141 the number in the buffer memory 90 in RAM 33 and generates at step 142 a request message having the format shown in FIG. 12.

The request message comprises a header 120, the input dialed number 121, location details 122 and a PIN number 123 identifying the user.

An outgoing call is generated by operating at step 143 the dialing circuit 102 which outputs a telephone call via line 104 to the telecommunications system 3, dialing the telephone number of an ISP (Internet Service Provider) which gains access to the Internet 4E. The URL (Uniform Resource Locator) corresponding to the server of the control centre 7 is communicated to the ISP via the modem 103 and two-way communication is established with the control centre. A response message is generated by the control centre 7 in the form shown in FIG. 13 and the response message is transmitted at step 144 by the control centre and received at step 145 via the modem 103 to be stored at step 146 by the processor 30 in the cache memory 131 of RAM 33.

The response message comprises a header 130, routing data 131 and dialing protocol data 132 together with limit-of-use data 133.

The response message is stored in the cache memory 311 in association with the request message to which it corresponds.

The CPU 30 terminates at step 145 the communication session via the Internet 4E by controlling the modem 103 and dialing circuit 102 and then initiates at step 147 a new telephone call via the dialing circuit 102 using the modified telephone number 131. The connection is then established with the call destination 2 and the microphone and speaker circuit 38 is enabled to allow telephone conversation to proceed between the user and the call destination 2.

The microphone and speaker circuit 38 may optionally include a tone generating circuit to provide a comfort tone to the user during the period in which the processor 30 communicates with the control centre 7 via the Internet 4E and modem 103.

As in the case of preceding embodiments, the processor 30, before initiating communication with the control centre 7, checks at step 142 with the cache memory 311 to determine whether a response message already exists by checking to see if a request message identical to the newly generated request message already exists in the cache memory. If such a response message exists and is retrieved at step 148, and is not precluded by an exclusion condition such as a time-out condition, the routing data 131 contained in the response message stored in the cache memory will then be utilised at step 147 without the need to contact the control centre 7.

The arrangement of FIGS. 11, 12 and 13 may similarly be applied to operation of a facsimile machine 105 as illustrated in FIG. 10, the microphone and speaker circuit 38 of FIG. 11 being replaced or supplemented by appropriate scanning and facsimile signal generating circuits.

The embodiment of FIG. 10 may be modified as illustrated in FIG. 15 by providing the telephone 100 with a separate communication path 140 for connection to the Internet. This communication path 140 may be provided for example by connection to a cable network 4G via a data channel which is separate and distinct from the telephone line 104.

Use of the telephone of FIG. 15 differs from the process outlined in FIG. 14 in that, at step 143, the access to the control centre 7 is made via the separate communication path 140. At step 145, connection with the control centre via the separate communication path 140 is terminated. At step 147, the new telephone connection is made via the telephone line 104 in the normal manner.

A further embodiment will now be described with reference to FIG. 16 using corresponding reference numerals to those of preceding figures where appropriate for corresponding elements.

The embodiment of FIG. 16 comprises a stand alone routing device 160 connected in series between a conventional telephone 73 and the services of a local network 4A of a telecommunications system 3. Typically, in a domestic household situation, the routing device 160 will have a socket into which the telephone lead 161 is received and will have an output telephone lead 162 connected to a standard wall socket for connection to the local network 4A.

FIG. 17 illustrates schematically the structure of the routing device 160. The device at FIG. 17 includes a relay 163 operable to selectively interrupt connection between the input telephone line 161 and output telephone line. When a telephone call is initiated, the relay 163 is opened and the telephone number dialed by the telephone 73 is detected by means of a tone detector circuit 164. The routing device 160 includes a processor 30, a ROM 32, a RAM 33 including a buffer 90 and cache memory 311 and an internal clock 36. The processor 30 is connected to the tone detector circuit 164 and responds to the received telephone number corresponding to the call destination 2 by storing the number in buffer memory 90 and generating a request message in the manner described above with reference to previous embodiments.

An outgoing call is generated on the line 162 using a tone generator 165 and received incoming messages from the control centre 7 are detected by means of a further tone detector 166 whose output is connected to the processor 30.

The processor 30, after receiving a response message containing routing data defining a modified telephone number, dials the modified number using the tone generator 165 and connects the telephone 73 to the call destination by closing the relay 163 once connection is made.

The processor 30 of the routing device 160 is programmed to perform in a similar manner to the processors of preceding embodiments with respect to the use of buffer memory 90 and cache memory 311 for obtaining the modified telephone number.

The routing device 160 may be utilised in routing calls from facsimile machines or other devices substituted for the telephone 100 of FIG. 16.

As indicated by the broken line 140 in FIG. 16, the routing device 160 may alternatively be provided with a separate connection for Internet access.

FIG. 18 illustrates a further alternative embodiment in which the PBX described above with reference to FIG. 7 is modified to have direct connection with an on-site control centre 7 which is physically located in the internal network served by the PBX 70. Communication between the PBX 70 and the control centre 7 is in this instance carried out by the PBX outputting request messages via the internal network to the control centre 7 and receiving response messages in the same manner. The internal connection between the control centre 7 and the PBX 70 therefore corresponds to the alternative communication path 9 described above with reference to FIG. 1.

A further alternative embodiment is illustrated in FIG. 19 in which a terminal 1 such as a telephone or facsimile machine is provided with an interface module 190 communicating with a local area network 191. The local area network 191 provides communication between the terminal 1 and the control centre 7 for sending and receiving the request and response messages.

The interface module 190 in one example is an Ethernet network card which is provided in a terminal 1 comprising a facsimile machine.

FIG. 20 illustrates schematically the manner in which the present invention has application to communication systems in which packet switching techniques are universally applied. In FIG. 20, a packet switching network includes a region 2100 which corresponds to a cellular network system in which mobile telephones 20 are operable, the system including an air interface, and in which each of a number of mobile telephones 20 constitute nodes of the packet switching network. A further region 2101 of the network may be constituted either by the public service telephone network or the Internet or a combination thereof and a remaining portion 2102 provides local connection to the call destination 2, illustrated as a telephone 2 or to a personal computer 2005. The portion 2102 may for example be a cable network or another form of network which is equivalent in effect to a local exchange 4D of FIG. 1.

In a packet switched network such as illustrated in FIG. 20, the notion of a dialed telephone number may be replaced by a network address such as a URL. Alternatively, the destination of a call may be defined using either a telephone number or URL depending on the nature of the destination and the type of data to be transmitted.

When making a call from mobile telephone 20 to destination 2 or 2005, the above described method of communicating with a control centre 7 using request and response messages is utilised to select the preferred route.

In further embodiments, the region 2100 of FIG. 20 may be an alternative network structure servicing landline telephones or other terminals such as facsimile machines or personal computers.

Alternatives to the above described embodiments are envisaged in which for example the inclusion of a cache memory 131 is eliminated and the process of dialing a telephone number is simplified by for example removing steps 44, 410 and 411 from the method described with reference to FIG. 4.

In each of the above described embodiments which include the cache memory facility the processor 30 may be programmed to periodically review each item held in the cache memory and remove those items for which a time-out period has expired.

The mobile telephone 20 described above may utilise hardware corresponding to an existing mobile telephone. Alternatively, an existing mobile telephone may be modified to include an increased area of RAM in order to accommodate additional program and memory requirements.

In the above described embodiments, the processor is programmed to adopt a default configuration in which, if communication with the control centre 7 cannot be established, the input telephone number stored in the buffer memory 90 is utilised, assuming the absence of a corresponding response message in cache memory 311.

The generalised telecommunications device 1 of FIG. 1 may be a telephone, facsimile machine or computer apparatus equipped with a modem, or any device capable of initiating or handling telephone calls including data calls. The present-invention therefore encompasses the use of devices which are hybrid devices and those devices not expressly described in the above description but capable of achieving the above function.

In the above described embodiments, the request message includes information identifying the location of the device. Alternatively, the control centre may obtain such information by other means such as for example call line information obtained when the request message is received by a telephone connection.

In the above described embodiments, a time-out period may be set by data contained in the response message. Alternatively, the processor 30 may be programmed to automatically delete any messages stored in the cache memory after a predetermined time-out period has elapsed.

In each of the above described embodiments and the alternative arrangements discussed herein, the processor is controlled by a computer program stored in memory and initially loaded from a computer readable medium such as a compact disc or floppy disc.

Alternatively, the program may be communicated in the form of a signal transmitted by a communications channel to the device. The present invention includes a computer program, medium and signal containing processor implementable instructions for carrying out the above described methods of performing the invention.

The transmission of request and response messages has been described above in the examples using SMS format. Alternatively, the USSD (Unstructured Supplementary Service Data) protocol may be utilised. Alternative protocols for such message transmission include GPRS (General Packet Radio Service) transmissions which provides speeds of up to 150 kilobits per second. Each of the above described embodiments may therefore be modified to include the GPRS protocol for message transmission. A further alternative is the use of UMTS (Universal Mobile Telecommunications System) data packages.

Reference is made above to the use of an identification code contained in the request message and serving to identify the user to the control centre. The identification code may be generated automatically from stored information in the device or may, alternatively, be generated from a PIN number entered by the user using the input device 5. The PIN number may, alternatively, be required to be entered in addition to the use of the identification code stored in the device 1.

The embodiment of FIGS. 2-6 which describes operation of a mobile telephone may be modified to comprise a computer apparatus such as a PDA (Personal Digital Assistant) capable of being connected to a mobile telephone network for data transfer or Internet connection.

In each of the above described embodiments, the buffer memory may also be used to temporarily store the modified telephone number prior to the device using the number to dial the outgoing call.

In the above described embodiments, the making of a call is initiated by input of a dialed number or a network address by a user. Each of the above embodiments may be modified in accordance with the present invention to include the input of a called number or network address from a memory, including for example memories which are accessed as a phonebook by referring to key words or by the input of voice commands using a speech recognition circuit. Alternatively, a terminal in accordance with the present invention may receive the dialed number or network address from an external source such as a personal computer.

In each of the above described embodiments, the messages communicated between the control centre 7 and the terminal 1 may encrypted. An encryption application stored in the terminal may thereby be provided with encryption keys stored internally. The stored encryption keys may be updated periodically by including new keys in the updating information 65 contained in the response message.

The above embodiments include the option of caching routing information received from the control centre 7 by storing the information in cache memory 311. The cache memory may be configured to allow the option of routing certain calls on the basis of part of the dialed number, such as a prefix, stored in cache memory. For example, the terminal may be operated such that every call beginning with a prefix code such as 0044 will be routed using a carrier access string stored in cache memory. When the user dials 0044 163538774 for example, it is then sufficient for the cache memory to contain an instruction related to prefix 0044 so that it is unnecessary to send a request message to control centre, even though specific routing information for the complete number is not contained in cache memory.

When utilising the routing information provided from the control centre 7, the terminal 1 in many cases will simply add a prefix to the numbers input by the user. In some instances however it will be necessary to replace some or all of the dialed numbers with new numbers generated in accordance with the routing information. For example, if the dialed number is 0044 163538774, the routing information may require that the actual output number consists of 182, a pause for two seconds, followed by the remaining digits 44163538774. By removing the "00" digits at the start of the dialed number, the dialed number is made to comply with a requirement by a service provider to omit leading zeroes.

In the above description, references to dialing and dialing means are to be understood where appropriate to include outputting signals for initiating communication via a telecommunications system in whatever form is appropriate to the system and its protocols.

The invention claimed is:

1. A device for communication with a call destination via a telecommunications system, the device comprising:
   input means for receiving input data defining the call destination;
   message generating means for generating a request message comprising the input data;
   output means operable to output the request message in use to a control centre;
   receiving means operable to receive from the control centre a response message comprising routing data defining a preferred route based upon performance characteristics and charging rates for routing a call to the call destination via the telecommunications system; and
   initiating means for initiating communication with the call destination using the routing data.

2. A device as claimed in claim 1 wherein the input data comprises a telephone number of the call destination, wherein the routing data is representative of at least part of a modified telephone number defining the preferred route, and wherein the initiating means is operable to initiate communication using the modified telephone number.

3. A device as claimed in claim 2 wherein the routing data is representative of the entire modified telephone number for use by the initiating means.

4. A device as claimed in claim 2 wherein the routing data is representative of a prefix code and wherein the initiating means comprises means for adding the prefix code to the input telephone number to obtain the modified telephone number.

5. A device as claimed in claim 1 wherein the response message comprises protocol information and wherein the initiating means is responsive to the protocol information when initiating communication with the call destination using the routing data.

6. A device as claimed in claim 5 wherein the protocol information defines a wait period to be inserted between outputting an initial portion and a remaining portion of the modified telephone number.

7. A device as claimed in claim 1 wherein the input data comprises a network address of the call destination.

8. A device as claimed in claim 1 comprising a cache memory operable to store the response message corresponding to respective input data and control means operable to extract the routing data from a stored response message in cache memory for use by the initiating means in response to a further input of the same input data.

9. A device as claimed in claim 8 wherein the response message comprises data representative of conditional information to be applied to use of the received message stored in cache memory, the conditional information including at least a time-out period after which the routing data should no longer be utilised.

10. A device as claimed in claim 1 comprising means for storing identification information for identifying the device in use to the control centre and wherein the message generating means is operable to include the identification information in the request message.

11. A device as claimed in claim 1 wherein the initiating means is operable to initiate communication in use with the control centre whereby the output means is operable to output the request message via the telecommunications system.

12. A device as claimed in claim 1 wherein the output means is operable to output the request message using a first communications channel which is separate and distinct from a second communications channel used by the initiating means.

13. A device as claimed in claim 12 wherein the first communications channel comprises one of:
   (a) the Internet;
   (b) a public data network; and
   (c) a private data network.

14. A device as claimed in claim 1 wherein the device is constituted by a telecommunications terminal and wherein the input means comprises a keypad for the input of the input data by a user.

15. A device as claimed in claim 14 wherein the terminal comprises a mobile telephone for wireless communication in use with a mobile telephone network of the telecommunications system.

16. A device as claimed in claim 15 wherein the output means is operable to output the request message in a text message format corresponding to a text message protocol of the mobile telephone network.

17. A device as claimed in claim 15 wherein the receiving means is operable to receive the response message in a text message format corresponding to a text message protocol of the mobile telephone network and wherein the mobile telephone is operable to inhibit display to the user of text corresponding to the response message.

18. A device as claimed in claim 15 further comprising means for updating at least one of a preferred network table and a barred network table using updating information contained in the response message.

19. A device as claimed in claim 14 wherein the device is constituted by a telephone for land line communication.

20. A device as claimed in claim 14 comprising a facsimile machine.

21. A device as claimed in claim 14 comprising a computer apparatus having a modem.

22. A device as claimed in claim 1 wherein the device is constituted by an interface apparatus having means for connection to at least one user operable terminal, wherein the input means is operable to receive the input data via said connection means from the user operable terminal.

23. A device as claimed in claim 22 wherein the interface apparatus comprises a private branch exchange and wherein the connection means facilitates connection to telephone lines of an internal network served by the private branch exchange.

24. A device as claimed in claim 22 wherein the device is constituted by a routing device having means for connection to a user operable terminal and wherein the input means is operable to receive the input telephone number via the connection means.

25. A device as claimed in claim 19 further comprising an interface module for communicating with a local area network to which the control centre is connected in use.

26. A method of operating a telecommunications device for communication with a call destination via a telecommunications system, the method comprising the steps of:
   receiving an input telephone number defining the call destination;

generating a request message comprising data representative of the input telephone number;

outputting the request message to a control centre;

receiving a response message from the control centre, the response message comprising routing data representative of at least part of a modified telephone number defining a preferred route based upon performance characteristics and charging rates for routing a call to the call destination via the telecommunications system; and initiating a telephone call connection to the call destination using the modified telephone number.

27. A method as claimed in claim 26 wherein the input data comprises a telephone number of the call destination, wherein the routing data is representative of at least part of a modified telephone number defining the preferred route, and wherein the initiating step initiates communication using the modified telephone number.

28. A method as claimed in claim 27 wherein the routing data is representative of the entire modified telephone number for use in the initiating step.

29. A method as claimed in claim 27 wherein the routing data is representative of a prefix code and wherein the initiating step comprises adding the prefix code to the input telephone number to obtain the modified telephone number.

30. A method as claimed in claim 26 wherein the response message comprises protocol information and wherein the initiating step is made responsive to the protocol information when initiating communication with the call destination using the routing data.

31. A method as claimed in claim 30 wherein the protocol information defines a wait period to be inserted between outputting of an initial portion and a remaining portion of the modified telephone number.

32. A method as claimed in claim 26 wherein the input data comprises a network address of the call destination.

33. A method as claimed in claim 26 comprising a step of storing in a cache memory the response message corresponding to respective input data and extracting the routing data from a stored response message in cache memory for use in the initiating step in response to a further input of the same input data.

34. A method as claimed in claim 33 wherein the response message comprises data representative of conditional information to be applied to use of the received message stored in cache memory, the conditional information including at least a time-out period after which the routing data should no longer be utilised.

35. A method as claimed in claim 26 comprising storing identification information for identifying the device in use to the control centre and wherein the message generating step includes the identification information in the request message.

36. A method as claimed in claim 26 wherein the initiating step initiates communication with the control centre whereby the request message is output via the telecommunications system.

37. A method as claimed in claim 26 wherein the output step outputs the request message using a first communications channel which is separate and distinct from a second communications channel used in the initiating step.

38. A method as claimed in claim 37 wherein the request message is output via one of:
(a) the Internet;
(b) a public data network; and
(c) a private data network.

39. A method as claimed in claim 26 wherein the device is constituted by a telecommunications terminal and wherein the receiving step comprises receiving the input of the input data by a user via a keyboard.

40. A method as claimed in claim 39 wherein the terminal comprises a mobile telephone for wireless communication with a mobile telephone network of the telecommunications system.

41. A method as claimed in claim 40 wherein the request message is output in a text message format corresponding to a text message protocol of the mobile telephone network.

42. A method as claimed in claim 40 wherein the response message is received in a text message format corresponding to a text message protocol of the mobile telephone network and wherein the mobile telephone inhibits display to the user of text corresponding to the response message.

43. A method as claimed in claim 40 further comprising updating at least one of a preferred network table and a barred network table using updating information contained in the response message.

44. A method as claimed in claim 39 wherein the device is constituted by a telephone for land line communication.

45. A method as claimed in claim 39 wherein the terminal comprises a facsimile machine.

46. A method as claimed in claim 39 wherein the terminal comprises a computer apparatus having a modem.

47. A method as claimed in claim 26 wherein the device is constituted by an interface apparatus providing connection to at least one user operable terminal, wherein the receiving step comprises receiving the input data from the user operable terminal.

48. A method as claimed in claim 47 wherein the interface apparatus comprises a private branch exchange providing connection to telephone lines of an internal network served by the private branch exchange.

49. A method as claimed in claim 47 wherein the device is constituted by a routing device providing connection to a user operable terminal and wherein the receiving step comprises receiving the input telephone number via the connection with the user operable terminal.

50. A method as claimed in claim 44 further comprising communicating via an interface module with a local area network to which the control centre is connected.

51. A control centre comprising:
receiving means operable to receive a request message comprising data representative of an input telephone number defining a call destination and information defining the location of a device from which communication with the call destination via a telecommunications system is required;
means for determining a preferred route based up on performance characteristics and charging rates for communication via the telecommunications system;
means for generating a response message comprising routing data representative of at least part of a modified telephone number to be used by the device;
and means for transmitting the response message to the device.

52. A method of operating a control centre comprising:
receiving a request message comprising data representative of an input telephone number defining a call destination and information defining the location of a device from which communication with the call destination via a telecommunications system is required;
determining a preferred route based upon performance characteristics and charging rates for communication via the telecommunications system;

generating a response message comprising routing data representative of at least part of a modified telephone number to be used by the device;

and transmitting the response message to the device.

53. A computer readable storage medium storing processor implementable instructions for controlling a telecommunications device to carry out a method of communication with a call destination via a telecommunications system, the method comprising:

receiving an input telephone number defining the call destination;

generating a request message comprising data representative of the input telephone number;

outputting the request message to a control centre;

receiving a response message from the control centre, the response message comprising routing data representative of at least part of a modified telephone number defining a preferred route based upon performance characteristics and charging rates for routing a call to the call destination via the telecommunications system; and initiating a telephone call connection to the call destination using the modified telephone number.

* * * * *